United States Patent
Herdeg, III

(10) Patent No.: US 7,653,896 B2
(45) Date of Patent: Jan. 26, 2010

(54) SMART UI RECORDING AND PLAYBACK FRAMEWORK

(75) Inventor: Howard B. Herdeg, III, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 586 days.

(21) Appl. No.: 10/882,861

(22) Filed: Jun. 30, 2004

(65) Prior Publication Data

US 2006/0005132 A1    Jan. 5, 2006

(51) Int. Cl.
*G06F 9/44* (2006.01)
*G06F 3/00* (2006.01)

(52) U.S. Cl. .................. 717/113; 717/109; 717/125; 717/128; 715/704

(58) Field of Classification Search .................. 717/105, 717/106
See application file for complete search history.

(56) References Cited

U.S. PATENT DOCUMENTS

| | | | |
|---|---|---|---|
| 5,333,302 A | | 7/1994 | Hensley et al. |
| 5,335,342 A | | 8/1994 | Pope et al. |
| 5,396,591 A | | 3/1995 | Goss |
| 5,542,069 A | | 7/1996 | Meppelink et al. |
| 5,781,720 A | | 7/1998 | Parker et al. |
| 5,786,814 A | | 7/1998 | Moran et al. |
| 6,046,741 A | | 4/2000 | Hochmuth |
| 6,184,880 B1 | * | 2/2001 | Okada ........................ 715/704 |
| 6,357,038 B1 | * | 3/2002 | Scouten ...................... 717/122 |
| 6,535,912 B1 | | 3/2003 | Anupam et al. |
| 6,549,216 B1 | * | 4/2003 | Schumacher et al. ........ 715/704 |
| 7,036,079 B2 | | 4/2006 | McGlinchey et al. |
| 7,099,893 B2 | * | 8/2006 | Bischof et al. ........... 707/104.1 |
| 7,120,676 B2 | | 10/2006 | Nelson et al. |
| 7,139,978 B2 | * | 11/2006 | Rojewski et al. ............ 715/744 |
| 7,275,240 B2 | * | 9/2007 | Cole et al. .................. 717/137 |
| 2001/0043234 A1 | * | 11/2001 | Kotamarti ................... 345/746 |
| 2002/0162053 A1 | | 10/2002 | Os |
| 2003/0142122 A1 | | 7/2003 | Straut et al. |
| 2003/0164850 A1 | * | 9/2003 | Rojewski et al. ............ 345/733 |
| 2004/0041827 A1 | | 3/2004 | Bischof et al. |
| 2004/0070612 A1 | * | 4/2004 | Sinclair et al. .............. 345/762 |
| 2004/0221262 A1 | * | 11/2004 | Hampapuram et al. ...... 717/113 |
| 2004/0261026 A1 | | 12/2004 | Corson |
| 2005/0278728 A1 | * | 12/2005 | Klementiev ................. 719/328 |
| 2006/0010420 A1 | | 1/2006 | Peterson et al. |
| 2006/0168467 A1 | * | 7/2006 | Couturier et al. ............... 714/4 |
| 2007/0106939 A1 | | 5/2007 | Qassoudi |

OTHER PUBLICATIONS

"Aldo's Macro Recorder 4.1," 6 pages, downloaded from the World Wide Web on Jun. 11, 2004.

(Continued)

*Primary Examiner*—Tuan Q Dam
*Assistant Examiner*—Isaac T Tecklu
(74) *Attorney, Agent, or Firm*—Klarquist Sparkman, LLP.

(57) ABSTRACT

Techniques and tools are described for recording and reliably replicating graphical user interface ("GUI") activity for various applications, including applications that have dynamic user interfaces. The techniques and tools may be used in combination or separately. For example, a recording tool receives internal macro data from a GUI-based application as opaque tokens, which are embedded into playback code. A playback tool executes the playback code by passing the embedded tokens back to their original application for playback by the application's internal recorder.

31 Claims, 6 Drawing Sheets

OTHER PUBLICATIONS

"WinTask," 3 pages, downloaded from the World Wide Web on Jun. 11, 2004.
"Automate and Monitor IT Systems," 1 page, Unisyn Software, downloaded from the World Wide Web on Jun. 11, 2004.
"Automate Architecture," Unisyn Software, 2 pages, downloaded from the World Wide Web on Jun. 11, 2004.
"Macro Scheduler," MJNET, 3 pages, downloaded from the World Wide Web on Jun. 11, 2004.
"Graphical User Interface," FOLDOC, 1 page, downloaded from the World Wide Web on Apr. 24, 2004.
Microsoft Corporation, "Microsoft Windows for Workgroups User's Guide," p. 137 (1985).
"Programming Model for WinFx: Common Programming Techniques: Accessibility: Implementing the Selection Control Pattern," 1 page, downloaded from the World Wide Web on Mar. 9, 2004.
"Programming Model for WinFx: Common Programming Techniques: Accessibility: Implementing the Value Pattern," 1 page, downloaded from the World Wide Web on Jun. 30, 2004.
"Programming Model for WinFx: Common Programming Techniques: Accessibility," 3 pages, downloaded from the World Wide Web on Mar. 4, 2004.
"Programming Model for WinFx: Common Programming Techniques: Accessibility: Introduction to User Interface Automation," 3 pages, downloaded from the World Wide Web on Mar. 4, 2004.
"Programming Model for WinFx: Common Programming Techniques: Accessibility: About the User Interface Automation Tree," 2 pages, downloaded from the World Wide Web on Mar. 4, 2004.
"Programming Model for WinFx: Common Programming Techniques: Accessibility: About User Interface Automation Events," 2 pages, downloaded from the World Wide Web on Mar. 4, 2004.
"Programming Model for WinFx: Common Programming Techniques: Accessibility: About User Interface Automation Input," 2 pages, downloaded from the World Wide Web on Mar. 4, 2004.
"Programming Model for WinFx: Common Programming Techniques: Accessibility: About User Interface Automation Security," 2 pages, downloaded from the World Wide Web on Mar. 4, 2004.
"Programming Model for WinFx: Common Programming Techniques: Accessibility: About User Interface Automation Control Patterns," 3 pages, downloaded from the World Wide Web on Mar. 9, 2004.
"Programming Model for WinFx: Common Programming Techniques: Accessibility: About User Interface Automation Properties," 1 page, downloaded from the World Wide Web on Mar. 9, 2004.
"Programming Model for WinFx: Common Programming Techniques: Accessibility: About User Interface Automation Support for the Combo Box Control," 3 pages, downloaded from the World Wide Web on Mar. 9, 2004.
"Programming Model for WinFx: Common Programming Techniques: Accessibility: About User Interface Automation Support for the ListBox Control," 2 pages, downloaded from the World Wide Web on Mar. 9, 2004.
"Programming Model for WinFx: Common Programming Techniques: Accessibility: About User Interface Automation Support for the Menu Control," 4 pages, downloaded from the World Wide Web on Mar. 9, 2004.
"Programming Model for WinFx: Common Programming Techniques: Accessibility: Control Patern Mapping for User Interface Automation Clients," 2 pages, downloaded from the World Wide Web on Mar. 9, 2004.
"Programming Model for WinFx: Common Programming Techniques: Accessibility: Control Pattern Mapping for User Interface Automation Providers," 6 pages, downloaded from the World Wide Web on Mar. 9, 2004.
"Programming Model for WinFx: Common Programming Techniques: Accessibility: Implementing Control Patterns on 'Avalon' Platform Elements," 2 pages, downloaded from the World Wide Web on Mar. 9, 2004.
"Programming Model for WinFx: Common Programming Techniques: Accessibility: Implementing the Invoke Control Pattern," 2 pages, downloaded from the World Wide Web on Mar. 9, 2004.
"Programming Model for WinFx: Common Programming Techniques: Accessibility: Introduction to UI Spy," 1 page, downloaded from the World Wide Web on Mar. 9, 2004.
"Programming Model for WinFx: Common Programming Techniques: Accessibility: Using User Interface Automation for Clients," 4 pages, downloaded from the World Wide Web on Mar. 9, 2004.
"UI Terminology," 5 pages, downloaded from the World Wide Web on Jun. 15, 2004.
"MacroExpress®: The Windows Automation Tool," 2 pages, downloaded from the World Wide Web on Jun. 11, 2004.
"MacroExpress®: PGM Functions Library," 1 page, downloaded from the World Wide Web on Jun. 11, 2004.
"AIM Keys: the All-in-one Macro Utility," AIMSOFT, 2 pages, downloaded from the World Wide Web on Jun. 11, 2004.
"RapidKey—Autotext and Macros for Windows 9x, ME, NT, 2000, XP," 2 pages, downloaded from the World Wide Web on Jun. 11, 2004.
"TechWeb: TechEncyclopedia," 2 pages, downloaded from the World Wide Web on Jun. 11, 2004.
"Macro Express Home Page," 2 pp. (downloaded from the World Wide Web on May 17, 2006).
"Macro Recorder 3.6," 2 pp. (downloaded from the World Wide Web on Oct. 31, 2006).
"PGM Functions," 5 pp. (downloaded from the World Wide Web on May 17, 2006).
"Tool Mentor: Creating test scripts using rational robot," Copyright 1987-2000, 3 pages.
Chen, "Expressing graphical user's input for test specifications," EDCIS 2002, LNCS 2480, pp. 347-359, 2002. Springer-Verlag Berlin Heidelberg 2002.
Hudson et al., A Tool for Creating Predictive Performance Models from User Interface Demonstrations, UIST '99, pp. 93-102.
Meszaros, "Agile Regression Testing Using Record & Playback," OOPSLA 2003, pp. 353-360, Oct. 26-30, 2003.
Molander, "Reducing the user interface," IBM, 13 pages, Jun. 1, 2001.

* cited by examiner

Software 680 for smart recording and playback

SMART UI RECORDING AND PLAYBACK FRAMEWORK

TECHNICAL FIELD

Tools and techniques are described for recording user activity within various graphical user interface based applications. For example, a system-wide recording tool supports application-native macro or UI recording as well as non-native macro or UI recording.

BACKGROUND

I. Graphical User Interface

On many modern computer systems, users interact with software programs through a graphical user interface ("GUI"). Basically, a GUI is an interface between computer and user that uses pictures rather than just words to solicit user input and present the output of a program. The typical GUI is made up of user interface elements ("UI elements"), which are those aspects of a computer system or program that are seen, heard, or otherwise perceived or interacted with by a user. For example, UI elements include items such as icons, buttons, dialog boxes, edit boxes, list boxes, combo boxes, scroll bars, pick lists, pushbuttons, radio buttons and various components of World Wide Web pages (e.g., hyper-links and images). In a typical computer program it is common to encounter literally thousands of UI elements.

Although an individual element of a GUI may appear to the user as a single item, it may actually consist of a number of separate items or sub-elements that have been combined together. For example, a toolbar item may consist of a list element, a combo box element, a scroll bar element, etc. Furthermore, each of these sub-elements themselves may be composed from other sub-elements. In this manner, UI elements can serve as building blocks for building other, more complex, UI elements. Such an approach is useful because the software managing the user interface can re-use the definitions of certain common elements when assembling them into composite elements.

Many UI elements in a GUI environment represent features of a program and are displayed on the computer screen so users can interact with the program by selecting, highlighting, accessing, and operating them. This user interaction is done by maneuvering a pointer on the screen (typically controlled by a mouse or keyboard) and pressing or clicking buttons while the pointer is pointing to a UI element. For example, in a word processor, a user can maneuver the mouse to select an item on the program's menu bar, to click an icon from the tool bar, or to highlight blocks of text in the viewer window. Similarly, a user can use keyboard input to interact with a computer application. For instance, in the word processing program, a user can press "ALT-F," "CTRL-B," or other pre-defined keystroke combinations to access program features. Based on the input from the mouse or keyboard, the computer adds, changes, and manipulates what is displayed on the screen. GUI technologies provide convenient, user-friendly environments for users to interact with computer systems.

II. UI Automation

UI Automation ("UIA") is an accessibility framework for Microsoft Windows intended to address the needs of assistive technology products and automated test frameworks by providing programmatic access to information about the user interface ("UI"). For example, UIA allows a screen reader program to access information about the UI of a word processor, providing the reader program with the information it needs to provide audible cues to a visually impaired user. Through an application programming interface ("API") set of methods, UIA provides a well-structured mechanism for creating and interacting with a UI. Control and application developers use the UIA API set to make their products more accessible to different users through existing or new software (potentially written by other people) to access program menus and other UI elements. For example, braille screens, screen readers (narrators), magnifiers, and other software in Microsoft Windows can use UIA to facilitate computer use for users who otherwise may not have access.

In practice, UI Automation uses a hierarchy of UI elements located in a tree structure to provide reliable UI information to the operating system and computer applications. Elements of a GUI can be considered as nested within each other in order to accurately describe their organization. For example, at the very top of a tree structure is a desktop element that is representative of the GUI's "desktop" or default background area. The desktop element has within it several application elements for application programs that have been invoked and that are ready to execute according to a user's instructions (e.g., a typical Microsoft Windows desktop may have several instances of applications such as Microsoft Word, Microsoft Excel, etc. loaded and ready to execute). At a lower level in the tree structure hierarchy are frames associated with an application (e.g., a word processor application may have several frames visible to a user at any given time). Within each of the frames may be several documents, each document containing within it several UI elements (e.g., buttons, listboxes, etc.). UI elements may themselves be composites of other UI elements. For example, a dialog box or a combo box contains other UI elements such as a button control. Furthermore, the button element may contain yet other UI elements. Such nesting can be arbitrarily deeper and include an arbitrary number of branches depending on the user interface and its component elements.

For some operating system platforms, an instance of a UI element is assigned an identifier to help distinguish that particular UI element from other UI elements. For example, in a Microsoft Windows based operating system, applications are associated with module identifiers that identify applications within a given desktop context. Also, some user interface platforms (e.g., Microsoft Windows, Swing for Java) use a numeric identifier (control ID) for certain UI elements. In some computing environments, such as a Microsoft Windows environment, UI elements are often associated with a class name associated with the control class to which they belong. For instance, in a Microsoft Windows based system, common UI elements such as combo box, list box, and button are associated with class names such as ComboBox class, ListBox class, and Button class, respectively. Similarly, other UI frameworks may have names for their respective classes of UI elements.

Notably, these techniques identify a UI element's object class or type, but do not singularly provide a strong identifier that uniquely identifies a UI element across a reboot of the computer running the program, across a different build of the program when still in development, across the opening of an another instance of the same program, or for opening of the same program on another computer.

UIA overcomes these deficiencies by generating a composite ID that uniquely identifies a UI element in a GUI tree. UIA generates the composite identifier by adding identification information (e.g., control name or control type) that is directly associated with a UI element to hierarchical identification information (e.g., parent control, child control, and/ or sibling controls) and control pattern-specific information (e.g., depth of the UI element in the tree). For example, an identifier for a target UI element may be generated by collecting identifying information related to parent UI elements that describe the hierarchical arrangement between a target leaf UI element and the root element at desktop. Through the concept of a path, the related identifiers for a UI element's unique hierarchy and parentage can be leveraged to identify it uniquely and persistently.

The unique identifier (persistent ID) provides easy access to individual UI elements so that the functionality of a program hosting UI elements can be programmed and tested, and so that a particular UI element can be identified to other program modules. For additional information about UIA, see, for example, the documentation available through the Microsoft Developer Network.

III. Macros Builders and UI Recorders

The ability to record and playback a user's interaction with a computer in a GUI environment has the potential to benefit multiple parties, including businesses (or other large organizations), users, software developers, testers, and computer support personnel. For example, business organizations can streamline a business process, such as use of software for supply-chain management, by automating much of the process. Users benefit by creating macros or scripts that combine a series of inputted actions into a playback action triggered in a single step. Software developers can use the ability to record user actions to help generate test cases for software under development. Testers can use record and playback tools to build tests to perform automated regression testing. Computer support personnel can record user actions to discover the reason for computer crashes or hangs, or to help users understand how to use software.

A. Commercial Macro Builders

Many conventional macro builder programs generate scripts that show the internal commands and actions taken by the computer or application to perform a function. However, in many instances, users must independently develop scripts based on a set of scripting commands and complex programming constructs. Thus, users have to understand programming logic and, to some extent, the underlying logic of the programs being controlled to create and use a macro. For example, AutoMate, a macro program, uses a drag-and-drop task builder to create a macro script by dragging and dropping specific steps into the order they should be executed, which means the AutoMate user has to understand how and in what order commands should be issued. Macro Scheduler is a macro creation program that allows a user to write a macro script using more than 200 script commands and programming constructs (not including actual declared variables and other user-defined structures). The complexity required to create and edit the scripts generated by these macro programs and the fact that the scripts generated by these macro builders do not represent an actual step-by-step readable recording of UI activity lessen those macro programs' usefulness, particularly to novice users and to computer support personnel and software developers attempting to troubleshoot problems.

B. Internal Macro Languages

As an alternative to commercial macro building software, many applications have the built-in ability to record and playback macros using their own special-purpose application control language ("macro language"). An application's macro language is typically unique to the application and is generally based on the application's internal object model ("IOM"). While it is possible to build a macro language without object-oriented techniques, most internal models use an object-oriented representation of the structure of the program. The IOM provides an accessible outline or model of the classes, attributes, operations, parameters, relationships, and associations of the underlying objects for the program. Macro languages access their application's IOM and hook into its communications mechanisms (such as event calls) to access and call features within the application. For example, a user of Microsoft Word can record a macro to automatically format text. A main drawback of most macro languages, however, is that they are application specific. A macro recorded by one application generally is not supported by other applications, particularly if the two applications were developed by competing software companies. In some cases, a macro recorded for one version of an application is not supported by later versions of the application.

C. Dependence on Macros

Developing macros can be difficult, and many users and businesses are reluctant to do anything that might break their existing macros. Businesses in particular are reluctant to do anything that might negatively affect their business processes. In fact, many users and businesses are reluctant to upgrade software or even install patches for fear of "breaking" something. For example, suppose a business employs an automated business process (e.g., in the form of a macro) that scans received faxes, automatically performs optical character recognition ("OCR") on the fax to produce a text file version of the fax, compares the data in the text file to entries in a spreadsheet to verify account information, and finally sends a confirmation email to the sender of the fax. This business process most likely uses a combined set of potentially complicated macros and a variety of software packages to function properly (e.g., a scanner program, an OCR program, a spreadsheet program, a text file program, etc.). Businesses and users are often apprehensive about upgrading macros or software unless they have assurances that current investments into their automated processes will remain intact.

D. Other UI Recorders

Many conventional UI recorders have similar drawbacks to those of the macro tools described above in that they use complex scripting commands and programming constructs to represent data. Another drawback is that conventional playback is very dependent on the recording computer's pre-existing conditions. For example, playback may depend on a certain hardware configuration, software installation, and/or the dynamic state of the runtime environment (such as the availability or location of a UI element for a particular recorded interaction). Using a conventional playback tool, any changes to those pre-existing conditions can cause playback to fail.

As an example, suppose a user reconfigures an application user interface. Some GUI-based applications allow a user to move buttons, reconfigure menus, add or remove other UI elements for program features, add links to macros on a menu bar, or perform other UI alterations. Although the ability to personalize menus is a useful feature (e.g., enabling users to customize a UI to their specific needs), it may cause many recording and playback tools to fail because UI elements are not in their expected locations.

For example, the Microsoft Windows 3.1 Macro Recorder attempted to replicate user actions in a GUI by recording mouse movements and mouse coordinates when a mouse button was clicked. On playback, if a UI element was not where it was expected to be, playback failed. For additional information about macro recording in Microsoft Windows 3.1, see, for example, the reference entitled, User's Guide for Microsoft Windows for Workgroups, at page 137. As another example, suppose a user records UI activity at a low monitor/desktop resolution. Later, the user changes to a higher monitor/desktop resolution. In this case, as above, playback would most likely fail because the screen position of the UI elements has changed. Hence, as the computer environment changes playback becomes increasingly unreliable.

In conclusion, there is a need for simple, system-wide macro and UI recording tools that are compatible with existing macro languages and application-specific macro recorders. At the same time, there is a need for simple, system-wide macro and UI recording tools that work with dynamic user interfaces.

SUMMARY

Techniques and tools are presented herein for recording and reliably replicating graphical user interface ("GUI") activity for various applications. For example, a macro and UI recording and playback tool simplifies the tasks of building macros and recording GUI activity for some applications while still supporting application-specific macro recorders for other applications, and also supporting macro and UI recording against dynamic user interfaces.

According to a first aspect, a tool receives internal macro actions from graphical user interface-based applications as opaque tokens. For example, a software program records user activity in its own native recording environment. Based on the recorded input, the software program generates opaque tokens that are transmitted to the tool.

According to a second aspect, a tool combines recorded tokens from internal macro actions with other user interface activity. For example, a software program passes recorded internal macro actions as opaque tokens to a tool. The tool combines those opaque tokens with tokens received from a UI system recorder. Based on the combined tokens, the tool replicates user interface activity.

According to a third aspect, a tool collects recorded tokens associated with user interface activity from diverse applications and replicates the user interface activity by supplying each recorded token to the application with which each token is associated. For example, user interface activity spanning multiple applications is recorded as recorded tokens and combined by the tool into playback code. The tool replicates the recorded user activity by passing the recorded tokens from the playback code to the proper software programs.

According to a fourth aspect, a tool passes recorder tokens to a software program for playback by the internal recorder of the software program. For example, internal macro instructions are extracted from a set of recorder tokens and supplied to the internal recorder of the software program associated with the tokens for playback.

Additional features and advantages of the invention will be made apparent from the following detailed description of implementations that proceeds with reference to the accompanying drawing.

DETAILED DESCRIPTION

Figure 1:
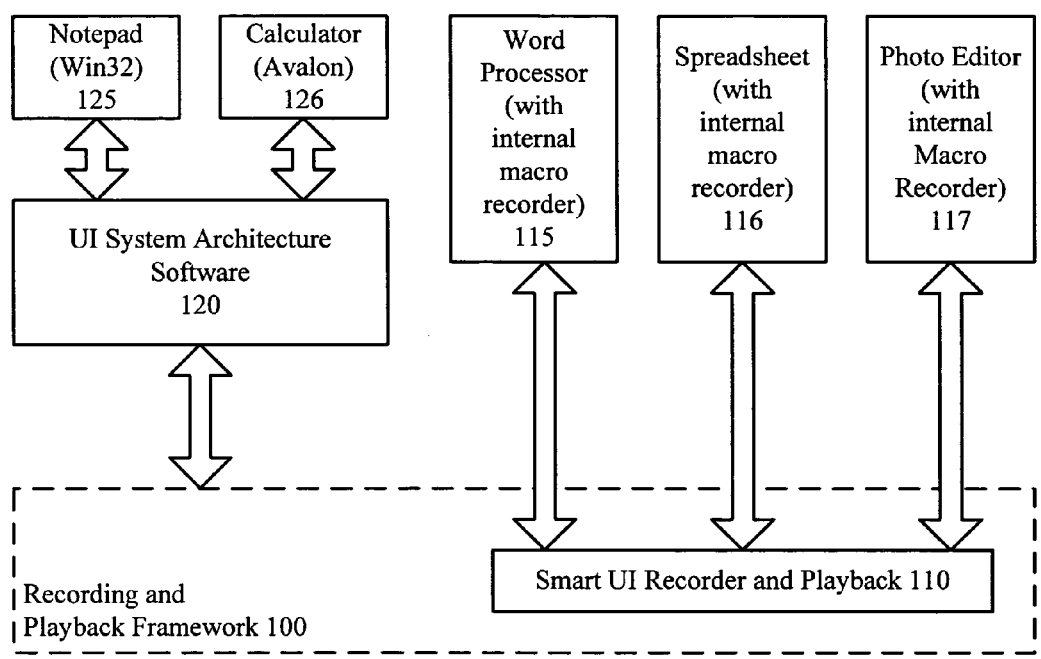
FIG. 1 is a block diagram of a user interface recording and playback framework.

The following description is directed to techniques and tools for macro and UI recording and playback for diverse GUI-based software. For example, a system-wide macro and UI recording tool uses an appropriate recording technique depending on the type of user activity being recorded and the recording capabilities of the application being used (at times referred to herein as "smart" recording). The tool may use a ULIA-based recording mechanism to record user activity against a UIA-compatible application. If the application is not UIA-compatible (or even if it is but recording with another mechanism is desired), the tool may record the raw steps (e.g., mouse button clicks, keystrokes) that a user performs interacting with the application. The tool may use a special recording mechanism in various circumstances. These circumstances include recording of activities described in an application-specific internal macro language (recorded by the application using its own internal recording mechanism) and recording of activities against a dynamic user interface. The tools described herein may record activity against various kinds of applications, operating system software, or other software.

U.S. patent application Ser. No. 10/869,184, entitled "Recording/Playback Tools for UI-based Applications," filed Jun. 15, 2004, the disclosure of which is hereby incorporated by reference, describes various recording and playback tools. Some of these tools use the UIA framework to record input based on a UI element's identification value ("UID"). UIA generates a composite ID that uniquely identifies a UI element in a GUI. The UID depends at least in part on location of the UI element in the user interface and its relationship with other UI elements. When a tool uses a UID to record and playback activities involving a specific UI element, changes to the element's location can cause playback to fail.

For example, suppose a user reconfigures a user interface by removing menu bar buttons. When a playback tool attempts to actuate the removed button, playback fails. As another example, often when an application is upgraded features are moved and/or renamed to accommodate new features. For instance, suppose in one version an "Open File" feature is located as the third option on a "File" menu. In a subsequent release, the "Open File" feature is moved to accommodate a "New File" feature, and "Open File" becomes the fourth item listed on the "File" menu. Macros based on the old user interface may break because the UI element moved and/or the UID has changed.

In some implementations, a system-wide macro and UI recording tool uses smart recording to address these kinds of problems. An application records user actions in the application's internal macro language. After recording, the recorded steps expressed in the application's internal macro language are passed as opaque recorded step tokens from the application to the macro and UI recording tool. The system-wide macro and UI recording tool may then further encapsulate the recorded step tokens and/or associate the recorded step tokens with marking information. In some implementations, each macro instruction is converted into a separate recorded step token. Alternatively, a series of related macro language instructions are wrapped into one recorded step token. Those tokens maintain the temporal sequencing of the underlying macro language instructions so as to permit them to be played back by the application as they were recorded, while also allowing for interoperation with the generalized, system-wide macro and UI recording tool. After receiving the recorded step token, the tool optionally generates code that reflects the recorded steps. Subsequently, the code may be played back to recreate the recorded steps or, alternatively, the code may be edited for testing, troubleshooting, or other purposes.

For example, suppose a word processor has a macro language instruction "Open(filename)" that hooks into the application's internal object model to open a file with the name "file name." During recording with the smart recording tool, the macro instruction is passed as a recorded step token, associated with other appropriate information, and stored for playback, at which time the underlying instruction, "Open (filename)," is passed as a recorded step token from the smart recording tool back to the application. This permits applications to use their own native recording environments to record and playback UI activity within a system-wide UI recording and playback framework. A system-wide macro may be written that is not subject to the problems associated with menu customizations and changes in user interfaces associated with software upgrades, so long as the underlying macro language remains compatible with prior versions of the software. Moreover, the system-wide recording framework provides a unified recording and playback interface. It also simplifies the interleaving of macros and other UI recordings for different applications in combined macro and UI recording processes.

As part of the system-wide UI recording framework, when an application does not use an internal macro recorder or other application-specific UI recorder, a different recording mechanism may be used. For example, a UIA-based recording system is used, as described in the U.S. patent application entitled "Recording/Playback Tools for UI-based Applications," which works well for recording user interface activity against applications having a static set of menus. Alternatively, if an application does not support operation according the UI Automation architecture, the system-wide UI recording framework RPF may simply record the raw steps a user performs as he or she interacts with the UI-based application. In some cases, the various recording techniques are used in combination. For example in some test cases the raw user input, the UIA-based data, and internal macro recorder data are all recorded.

Recording the raw steps (e.g., mouse clicks, keystrokes) that a user performs interacting with a UI-based application is relatively simple; the challenges are in how to represent and process this information when an application has a configurable user interface (e.g., one which allows the menus and menu items to be rearranged at will), when an application is upgraded modifying the user interface, or when an application processes macro or UI recording information in an internal language. Conceptually, some techniques and tools described herein improve recording performance by integrating the internal recording capabilities of the application being recorded with an abstract, user-friendly interface through which a user may convert recorded steps and input into playback code. As noted above, applications with their own internal recording capabilities may invoke their internal recorder to map a user's actions to the application's internal object model, thus solving the "upgrade lock-out" and menu reconfiguration problems caused by simple menu/menu-item recording.

In some implementations, application-specific macro or UI recording data is collected and then converted into recorded step tokens using tokenizing techniques. The techniques and tools create opaque tokens defining user interaction with an application. Once the recorded step tokens have been generated, other recorded actions (e.g., UIA events also in tokens) may be converted into programming code for playback on the same or another computer, potentially with application-generated recorded step tokens still embedded within the programming code.

In various common situations, the techniques and tools described herein allow a system-wide macro or UI recording tool to interoperate with various different kinds of software programs (e.g., UIA compatible applications, applications with internal macro recorders, applications that are non-UIA-compliant) and various kinds of user interfaces (e.g., static, dynamic). These techniques and tools make recording reliable and robust by using an application's own internal recording capabilities when appropriate. Moreover, the tools and techniques provide users with a consistent macro or UI recording interface. The techniques and tools can be implemented in various ways, and may be used in combination or separately.

I. UI Recording and Playback Framework

A UI Recording and Playback Framework ("UI RPF") is an extensible framework designed to facilitate the recording and playback of UI activity against applications or other software programs. Pluggable modules into the framework include filters, aggregators, tokenizers, and code generators. FIG. 1 shows an exemplary UI RPF 100 in which various techniques described herein may be implemented. Basically, the UI RPF 100 records (or works with other software that records) what a user is doing and reproduces (or works with other software that reproduces) his or her actions on the same or another computer. UI RPF 100 is a cross-application (e.g., system level) framework that can be used with multiple applications and in many configurations, and it is designed to facilitate recording and playback of various different kinds of user activity. It is a foundation upon which recording and playback tools can be built. The UI RPF 100 may use services provided by UI system architecture software 120, such as Microsoft UI Automation, to facilitate UI recording, but this is not a requirement of the framework 100.

FIG. 1 shows various modules associated with the UI RPF 100. The UI RPF 100 interacts with the UI system architecture software 120, which converts recorded UI input data such as mouse clicks, keystrokes, and input from applications 125, 126 into data that is more meaningful for UI recording and playback. The framework 100 receives recorded steps from applications such as a text editor 125 and calculator 126 through the UI system architecture software 120, possibly passed as tokens encapsulating system user interface actions. In some implementations, the UI RPF 100 employs a UI recording and playback mechanism described in the U.S. patent application entitled, "Recording/Playback Tools for UI-based Applications," to record and playback UI activity received through the UI system architecture software 120. Alternatively, the UI RPF 100 uses a different UI recording and playback mechanism.

The modules of the UI RPF 100 also include a smart recording and playback module 110 for interoperating with applications that have their own native macro recorder. Bypassing the UI system architecture software 120, the framework 100 receives recorded steps or other macro information in recorded step tokens from applications such as word processor 115, spreadsheet 116, and photo editor 117. Applications 115, 116, 117 have their own internal recording capabilities to map a user's input to actions in the application's native recording environment, then the applications 115, 116, 117 pass the internally recorded actions as tokens to the framework 100 through the smart UI recording and playback module 110.

The UI RPF 100 maintains a list of the applications for which macro or UI activity may be recorded. A new application seen by the UI RPF 100 is queried, at least the first time the application is launched, to see if it supports interaction across a smart recording interface. If the application does support interaction across the smart interface, then user actions may be recorded according to the application's recording capabilities and passed back and forth through the interface. Alternatively, user actions are recorded through both the application's internal recording mechanism (with data passing through the smart recording interface) and through the UI system architecture software 120, where both options are possible. Or, even if both options are possible, a user, application, or system-wide tool may decide to use either the application's internal recording mechanism or recording through the UI system architecture software 120, but not both. Or, the user, application, or system-wide tool may decide to record the raw steps (e.g., mouse movements, mouse button clicks, keystrokes) associated with the user actions, either separately or in combination with the other recorded data.

When user activity recorded through an application's internal recording mechanism is in turn recorded by the UI RPF through the smart interface, the application converts the recorded user activity events into tokens. The contents of these tokens are defined in Visual Basic for Applications ("VBA") or in some other language or object model used by the application. Ultimately, the information stored in the "payloads" of these tokens is not interpreted by the UI RPF 100, but only by the respective applications for which the information is in a native format. The UI RPF 100 may further tokenize recorded step tokens and associate the data with other relevant data such as the name of the application.

In the system-wide tool, recorded step token data may be concatenated with recorded step token data obtained from other applications with native recorders, or with recorded data obtained through the UI system architecture software 120, so as to implement system level recording and playback.

In addition to recording macro and UI data, the framework 100 may produce playback code that replicates the recorded activity and/or encapsulates data that allows other software to replicate the recorded activity.

For example, in a Microsoft Windows environment, a user begins recording UI activity, then clicks on the Windows "Start" button, and launches a word processor that works with the smart recording interface. In the context of the UI RPF, user actions including the mouse click on the "Start" button are recorded. When the word processor is launched, the UI RPF checks to see if the word processor is compatible with the smart recording interface. If it is, the UI RPF invokes the proper tools within the word processor itself to record user actions performed against it. If the word processor is also enabled to work with the UI system architecture software, the tool may also record user actions (UI Automation events) in conjunction with the UI system architecture software. Additionally, the tool may also record the raw steps (e.g., mouse button clicks, keystrokes) associated with user actions, which may be particularly relevant if the word processor does not support the smart recording interface and is not enabled to work with the UI system architecture software. Thus, the UI RPF may use alternative mechanisms for recording and playback.

This framework 100 may include elements of software and/or hardware. The relationships shown between modules in FIG. 1 indicate the main flow of information; other relationships are not shown for the sake of simplicity. Depending on implementation, modules can be added, omitted, split into multiple modules, combined with other modules, and/or replaced with like modules. Alternatively, a framework with different modules and/or other configurations of modules performs one or more of the UI recording and playback techniques described herein.

II. Smart Recording

Figure 2:
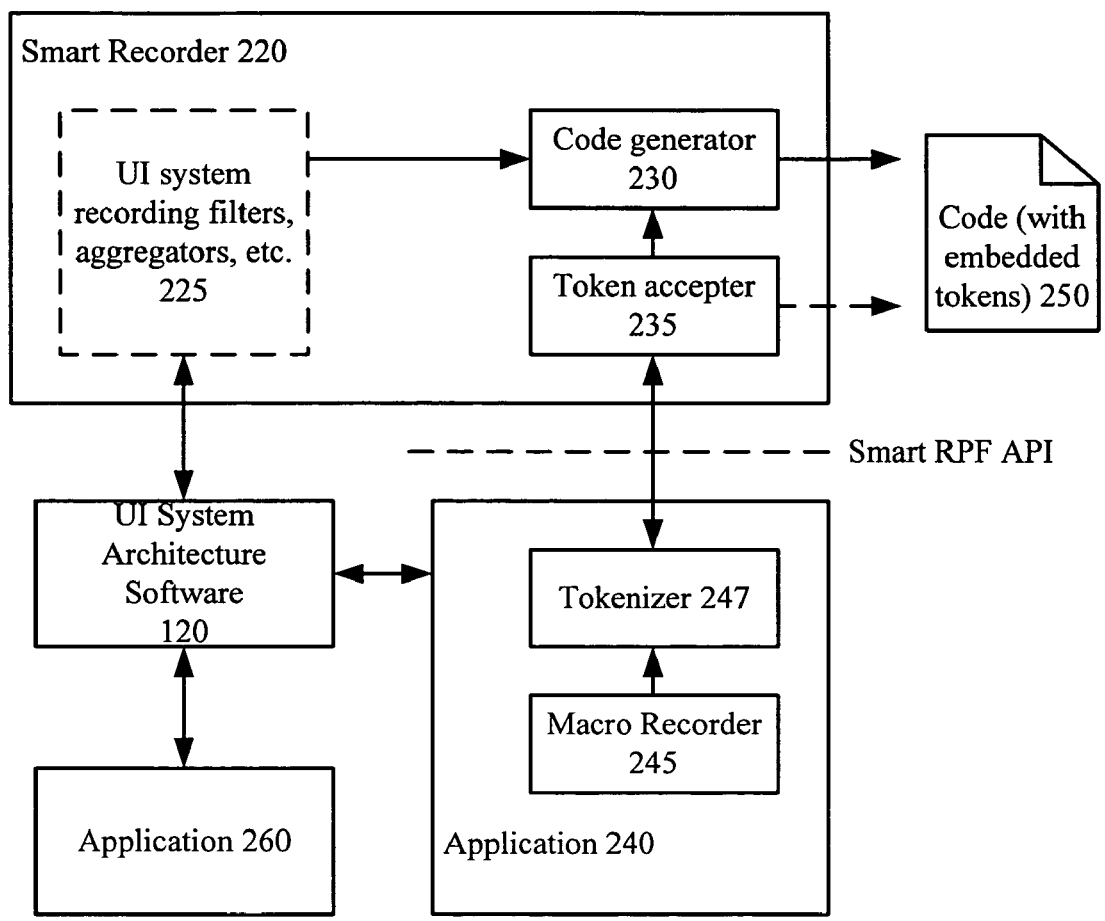
FIG. 2 is a block diagram of a system-wide UI recording tool.

FIG. 2 shows a system-wide UI recording tool 220 in conjunction with which various techniques described herein may be implemented. The UI RPF of FIG. 1 includes the recording tool 220. Alternatively, the recording tool 220 is used as part of another UI framework.

The recording tool 220 is system-wide in that it records UI system architecture information for UI recording with certain applications, but also interoperates with applications that record user interface activities in their own native macro recording environments. Such native recording applications exchange recorded macro or UI data with the tool 220 across the special native recording interface (shown as the smart RPF API in FIG. 2). This allows the tool 220 to use (and interoperate with) the application's own recording capabilities, which may thus allow UI recording for dynamic user interfaces and/or UI recording that is re-playable for changed user interfaces for different versions of an application.

The recording tool 220 controls the mechanism(s) to be used when recording macro or UI data. For example, depending on user input, user settings, or other criteria, the tool 220 decides whether to use native application recording, UI system recording, or both for a particular application. The tool may also record the raw UI input from the user's mouse and keyboard, either separately or in combination with the other recording mechanisms. The tool 220 may concurrently record macro or UI data for each of multiple applications in use, or for selected applications among multiple applications in use. For example, if a user configures the recording tool 220 to only record data from a word processor program, as a user records the cutting and pasting of data from a spreadsheet program to the word processor, only the steps related to the word processor are recorded.

A. Native Recording Path

For native macro or UI recording, a user interacts with the application 240 using user input devices such as a mouse, a keyboard, a touch pad, touch screen, Braille screen, joystick, microphone, or other similar device. As the user interacts with the application 240, the user inputs are processed and recorded by the macro/UI recorder 245 as steps in the application's native macro recording environment, as expressed in a language such as VBA, PerfectScript, M4, TeX, or other macro language. The application's internal recording capabilities provide a robust framework for acquiring data that may be predictably and reliably played back by the application. Recorded steps are only limited by the limitations of an application's native recording environment. For example, if an application permits a user to declare variables in a macro, those variables may be recorded and tokenized.

The application 240 tokenizes the recorded steps (shown as the tokenizer 247) so they can be passed to the tool 220. Then, the application passes the recorded step tokens to the tool 220 across the interface. The tokens are opaque to the tool 220, which means the tool 220 handles the recorded step tokens as discrete, opaque chunks of data whose contents are not interpreted by the tool 220. The application 240, on the other hand, may interpret and react to the contents of the recorded step tokens. The contents are in a native format for the application 240. For example, the application 240 encapsulates as a token recorded macro instructions to open a file exactly as they were recorded (e.g., as binary data, a text command, or a DLL instruction).

The application 240 converts each discrete recorded step into a token, or the application 240 groups multiple recorded steps as a single token. As for the mechanics of the tokenization, the application 240 may group recorded step data into one or more fields of a data structure for a token, which is then passed by copy or reference to the tool 220. Or, the application 240 may pass recorded step data as parameters of a method call, which the tool 220 receives and handles as opaque data. The application 240 may use an XML rules sheet (which defines a set of rules for tokenizing recorded step data) to reformat or reorganize the recorded step data into tokens. Or, the application 240 uses some other mechanism for tokenization. Conceptually, the tokenization may be viewed as placing the recorded step data in a token data structure, or wrapping the recorded step data with token information. This "hides" the macro language instructions from the tool, creating a token that is macro language independent but whose contents are recognizable in the appropriate native recording environment.

The application 240 may prepend, append, or otherwise add marking data to the recorded step when tokenizing the data. The marking data provides relevant details for playback, for example, application information (e.g., the name of the application and its version), a timestamp to indicate an order, privileges information (e.g., what rights are needed to play the step), etc.

The tool 220 receives tokens (shown as the token accepter 235) passed from one or more applications over the special native recording interface. While the tool 220 does not interpret the contents of the recorded step tokens, it may (instead of or in addition to the application) add additional layers of data to the recorded step tokens and/or associate the tokens with marking information such as application name, timestamps, index values, etc. so that the steps may be played back by the correct application and in the proper sequence. In at least this sense, the tool 220 may be considered to also perform tokenization.

The application 240 supports the native recording interface in that it formats information for passing to the tool 220 across the interface, makes the appropriate calls across the interface, implements callback methods for the tool 220 to call, etc. The tool 220 supports the interface in the sense that it implements methods for applications to call, handles information passed in by applications as expected, calls callback methods of applications, etc. The exact call and processing mechanisms used for the interface are implementation dependent.

B. UI System Recording Path

The application 240 with the native macro recorder and/or another application 260 may support interaction with the system recording tool 220 through the UI system architecture software 120. For UI system architecture recording, various components 225 of the recording tool 220 collect (a) user input data, (b) monitor other UI activity (such as focus change, selection change, window creation, etc.), (c) track information about the environment such as running applications, OS version, localization information, default UI language, current UI language, hardware devices and configurations, security modes, and/or other data that may help describe or recreate the proper environment for playback, (d) resolve the user input data to user interface elements affected by the user input, and (e) express the user activities as logical recording events. These logical recording events help provide readable UI recording output and reliable UI recording playback. Logical recording events may be considered as a type of UI recording token, but unlike the opaque recorded step tokens with native recording data, the tool 220 interprets the logical recording event tokens for viewing, editing, conversion to code, etc.

In some implementations, the tool 220 performs UI system architecture recording with filters and aggregators as described in the U.S. patent application entitled "Recording/Playback Tools for UI-based Applications." Alternatively, the tool 220 uses another technique for UI system architecture recording.

The tool 220 may display recorded UI system architecture steps in a viewer such as a debugger window, source code browser, or text editor so users may read and browse the data for errors. Typically, the tool 220 does not display information about the recorded step tokens with native recording data, as the contents of such tokens are opaque to the tool 220. When the recorded step tokens are associated with marking information such as application name, timestamps, action labels or other annotations from the application or user, the tool 220 may display such information. The data may similarly be saved to a file such as a log file for later analysis.

C. Other User Input

Various components 225 of the recording tool 220 may also collect raw user input data and similarly monitor other UI activity, track information about the environment such as running applications, etc. Recording these events helps in situations where an application is not compatible with the smart recording interface or the UI system architecture. These recorded actions may also be displayed in a viewer so users may read and browse the data for errors. Typically, the data from the raw user actions is less readable and reliable for playback than the other types of recorded tokens as explained above in the background. However, when the other recording techniques are inapplicable, this provides a mechanism for recording non-UIA and non-native recorder application data in the system-wide UI RPF. The data recorded from raw user actions may similarly be saved to a file such as a log file for later analysis.

D. Playback Code

In some implementations, the tool 220 combines tokens from different applications and recording modes in a single file by interleaving the data. For example, recorded step tokens for native recording actions for different native recorders are combined into one input stream, along with tokens for UI system architecture actions and any other user input. Typically, user input is received in a serial manner and sequencing of tokens in this manner a stream maintains proper ordering. Timestamps, index values, and application information may mark tokens to help maintain proper ordering. Or, the tool 220 creates separate files for different applications and recording modes.

For UI system action tokens, the tool 220 uses a code generator 230 to generate playback code 250 from the tokens. This can be done automatically or when the user selects a "Generate Code" option in the tool 220. The playback code 250 may be output in a variety of formats, including C#, XML, C++, JAVA, or any other programming, scripting, macro, or document-oriented language, or other commands or instructions for a playback interface or other mechanism to drive UI-based applications. For example, the code generator 230 maps tokens for UI system actions to corresponding instructions in the playback code 250. For additional details on code generation in a UI system architecture environment, see the U.S. patent application entitled, "Recording/Playback Tools for UI-based Applications," filed Jun. 15, 2004.

The tool 220 optionally puts the recorded step tokens for native recording actions into playback code 250 such as a script file that maintains the recorded step tokens in correct temporal sequence. Or, the tool 220 uses a code generator 230 to generate playback code 250 that includes the recorded step tokens. Notably, the recorded step tokens that encapsulate native recording data are opaque to the tool 220, so such tokens are typically passed through to the playback code 250, and are not interpreted by the tool 220 for conversion to other expressions.

The playback code 250 may be viewed, saved, edited, modified, added to, deleted from, compiled, or otherwise used prior to playback, with the expected limitations on the extent to which the tool may view, modify, etc. opaque recorded step tokens. Being able to edit the playback code 250 provides users with a convenient and powerful mechanism for creating macros, generating automatic test cases, automating steps in a program, etc. The generated code may be edited to add conditional expressions, to change variables, to add loops, and other programming instructions to the code. For example, on playback, suppose a piece of playback code alters a system file and requires that a user to be logged on with Administrator rights. Accordingly, a conditional expression is added to the playback code, which checks for the appropriate rights before running the piece of code. As another example, suppose software developers want to stress test a program by repeating the same series of instructions over and over again, so, a "for loop" is added to the playback code, which causes the playback code to be repeated a certain number of times.

The playback code 250 may then be used to manage playback of the recorded activity, as described below. The code 250 may be played back on the same computer or, alternatively, on a different computer(s).

E. Tool Architecture and Uses

In general, the various modules of the tool 220 are pluggable, which means they may be replaced with other modules with similar functionality for different applications. For example, the code generator 230 in the tool 220 is pluggable, so a developer can reuse some parts of the tool 220 but change the way code is generated by switching code generators. The tool 220 is thus extensible; its functionality may be altered for different applications. In some implementations, the tool 220 presents a menu of options for pluggable modules, thus allowing a user to control loading of appropriate modules for the functionality desired by the user.

For example, in a "heavyweight" recording mode, the tool 220 collects detailed information about UI activities and comprehensively logs the information. This provides more reliable playback but is more likely to perturb execution of the software against which activity is recorded. Or, in a "lightweight" recording mode, the tool 220 collects less information and, therefore, is less likely to perturb execution of the software against which activity is recorded. Yet, this may still provide enough information for playback in the same environment, for showing user activity to support personnel, or for other purposes.

Similarly, the tool 220 may record information in an interactive mode in which UI elements are highlighted by a bounding rectangle or flashing to show what is recorded. Other flashing feedback may be used to show the user the applications for which UI data is being recorded. Or, in the interactive mode, the user is prompted to enter descriptive annotation information for each action or for actions that the tool 220 or application 240 are unable to resolve. Alternatively, the tool 220 may operate in the background to record UI activity without disturbing the user.

The tool 220 is responsible for loading other pluggable modules as needed (e.g., modules for collecting data, tokenizing data, generating code, etc.), enforcing security (e.g., checking for privileges), spawning recording threads, synchronizing activities between modules, building and maintaining queues used for recording, logging errors (e.g., to a local file or optionally to a network service or server), and collecting information about the recordings (e.g., OS version, localization information, hardware configuration, etc.).

The relationships shown between modules in FIG. 2 indicate the main flow of information; other relationships are not shown for the sake of simplicity. Depending on implementation, modules can be added, omitted, split into multiple modules, combined with other modules, and/or replaced with like modules. Alternatively, a tool with different modules and/or other configurations of modules performs one or more of the recording techniques described herein.

The user interface of the tool 220 may be a VCR-like interface positioned around a recording window, docked to the top or bottom of a computer screen, or minimized to a task bar. The interface includes buttons for features such as "Record," Pause," "Stop," and "Play," as well as an area for presenting description of recorded steps when such description is available. For examples of such interfaces, see the U.S. patent application entitled "Recording/Playback Tools for UI-based Applications."

F. Recording Technique, Timing of Recording

There are two modes for transferring the tokens to a tool 220 during recording: batch mode and interactive mode. In general, in batch mode, recorded step tokens are collected at the application and delivered to the tool 220 when requested. These requests to retrieve the collected tokens may occur when focus has changed away from the recording application, and may also occur periodically to distribute the recording load.

In interactive mode, in contrast, tokens are sent from the application being recorded to the tool 220 as they occur. One disadvantage of sending tokens interactively is that it increases the cross-process loading on the CPU. In a particular situation, either batch or interactive mode may be preferable to the other, depending on the application being recorded, the amount of data being recorded, and how quickly recorded step tokens are being generated.

Figure 3:
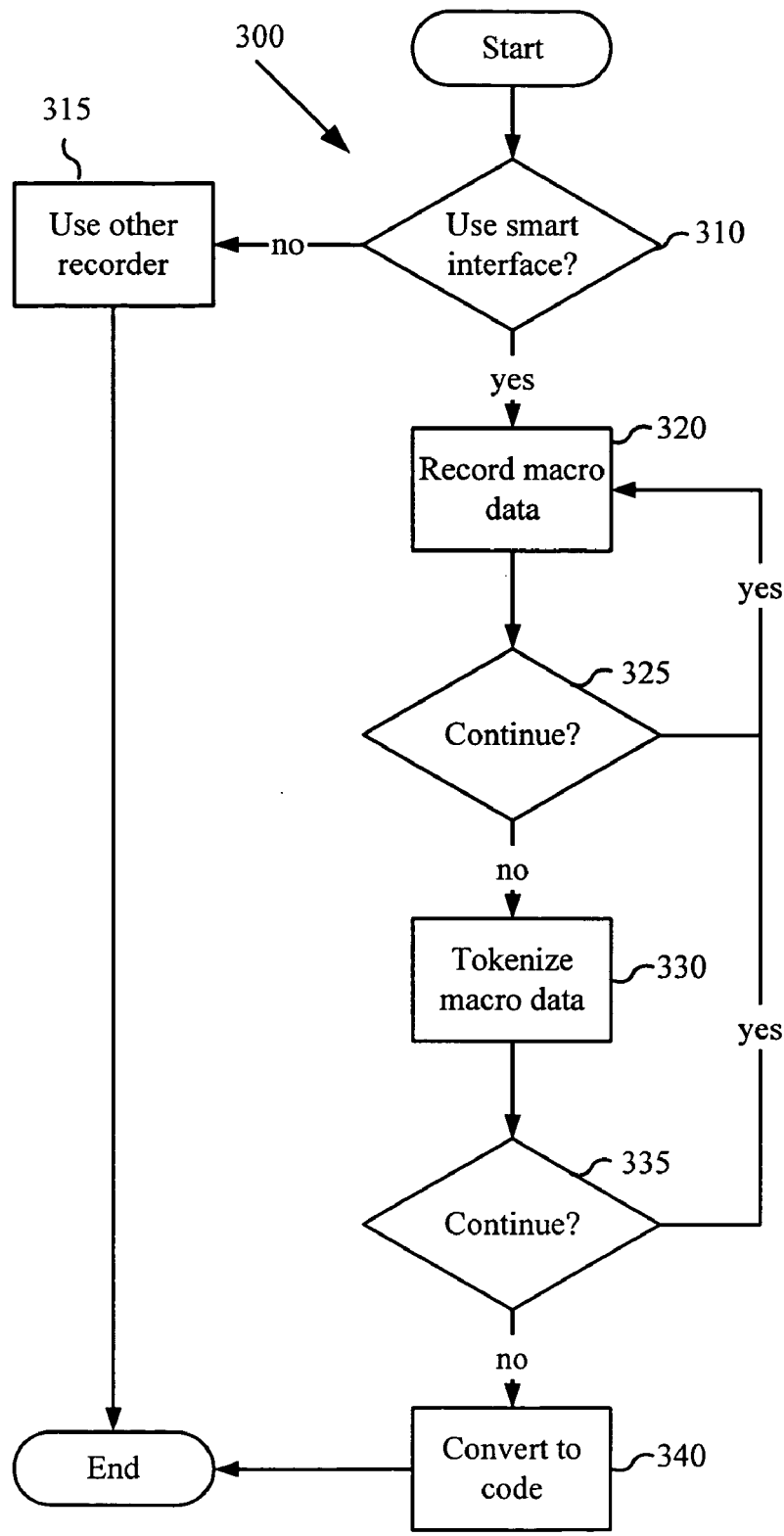
FIG. 3 is a flowchart illustrating a technique for recording application-native macro activity with a system-wide UI recording tool.

FIG. 3 shows a technique 300 for recording application-native macro activity with a system-wide UI recording tool. A tool and application such as the recording tool 220 and application 240 shown in FIG. 2 perform the technique 300. Alternatively, another tool and/or application perform the technique 300.

The tool checks 310 to see if the application uses a smart native recording interface. Some applications do not support interaction over the interface. Other applications might support interaction over the interface, but the user or tool determines not to use native recording. For example, when a user first launches an application the tool checks to see if the application supports interaction over the smart native recording interface, and if so, adds the name of the application to a list of applications that support interaction over the interface. Or, the tool checks to see if an application supports the smart native recording interface at the time recording begins. If an application does not support interaction over the interface, the tool may add the application to a list of non-supported applications If the smart native recording interface is not used, the tool uses 315 another recorder to record UI activity. For example, the tool uses a UIA software recorder for a UIA-enabled application, or alternatively, a raw UI input recorder for non-UIA-enabled applications. While FIG. 3 shows alternative paths of recording, the tool may instead use both the native recording and the other recording concurrently.

When the smart native recording interface is used, the application receives user input and records 320 macro data. Thus, the application's native recorder records steps performed by the user against the application The process of recording macro data continues until the application or tool determines 325 it should not continue. This check may evaluate any of a variety of conditions including whether the user has selectively terminated the recording process, whether the tool has requested tokens from the application in batch mode, whether a counter or timer has expired in batch or interactive mode, whether resources are available for tokenization, whether a designated UI element has been accessed, whether a specified number of recorded steps reached, etc.

The application then tokenizes 330 the recorded macro data, producing one or more tokens that are opaque to the tool. For example, the application uses a tokenization mechanism as described above and/or adds marking information as described above. Alternatively, the tool performs some or all of the tokenization or information addition.

The tool or application evaluates 335 whether to continue with the macro data recording. Again, this check may evaluate any of a variety of conditions, including whether the user has selectively terminated the recording process, whether tokenization succeeded or annotation information should be solicited from the user, etc.

The tool optionally converts 340 the tokens it receives to code such as a script in which the tokens are embedded. For example, the tool uses a code generation mechanism as described above.

Alternatively, various stages of the technique 300 are separately or in various combinations performed in conjunction with other stages. For example, while FIG. 3 shows the tokenizing 330 and conversion 340 occurring after macro data recording 320, alternatively one or both of these operations are performed concurrently with the recording 320.

III. Smart Playback

Figure 4:
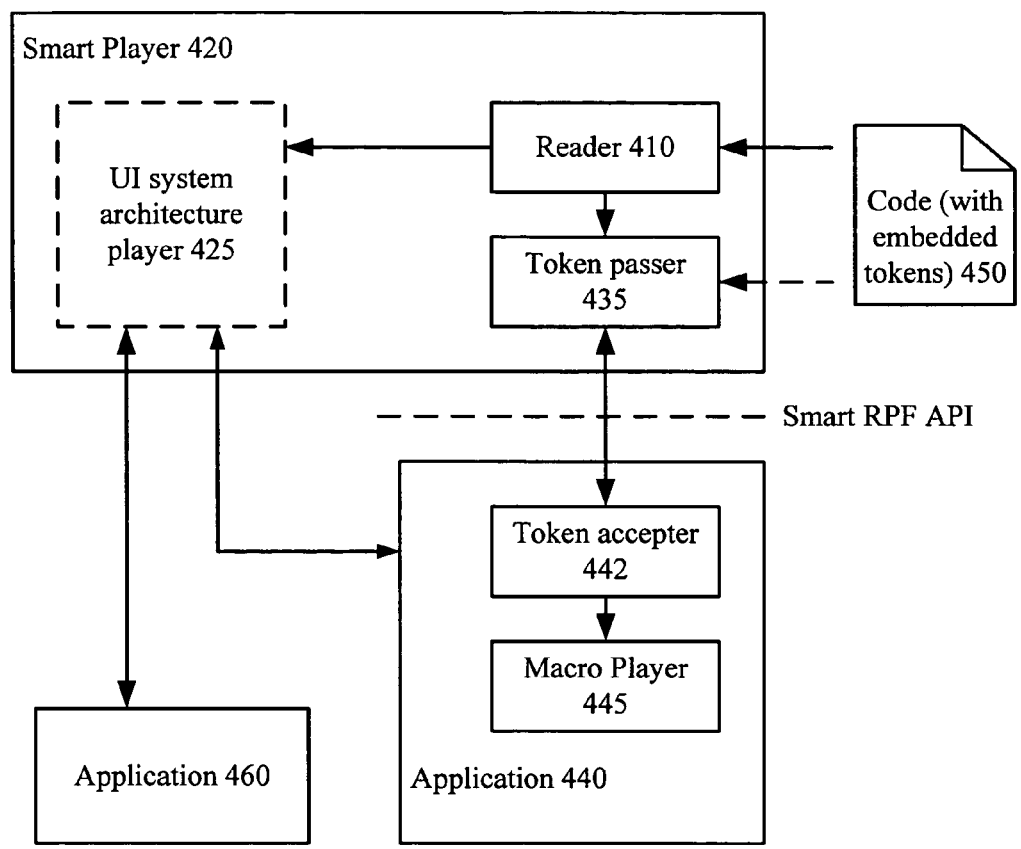
FIG. 4 is a block diagram of a system-wide UI playback tool.

FIG. 4 shows a system-wide UI playback tool 420 in conjunction with which various techniques described herein may be implemented. The UI RPF of FIG. 1 includes the playback tool 420. Alternatively, the playback tool 420 is used as part of another UI framework.

The playback tool replicates UI activity by receiving playback code and driving applications through UI system services, by passing tokens to applications for interpretation in their own native recording environment, or through playing back raw steps associated with the UI activity. The playback tool 420 is system-wide in that it handles playback of UI system architecture information for UI recording playback with certain applications, but also interoperates with applications that play back user interface activities in their own native macro recorder environments. Such native recorder applications exchange recorded macro or UI data with the tool 420 across a special native playback interface (shown as the smart RPF API in FIG. 4). This allows the tool 420 to control (and interoperate with) the application's own recording capabilities, which may thus allow UI playback for dynamic user interfaces and/or UI playback for changed user interfaces for different versions of an application.

The playback tool 420 controls the path(s) to be used when playing back macro or UI data. For example, depending on what data have been recorded, the tool 420 decides whether to use native application recorder playback, UI system playback, or both. Alternatively, the tool may also playback the raw recorded steps. The tool 420 may concurrently play back macro or UI data for each of multiple applications in use, or for selected applications among multiple applications in use.

A. Reader

As input, the playback tool 420 receives playback code 450 from a code generator such as the code generator 230 as illustrated in FIG. 2 or elsewhere. The playback code 450 may be in a variety of formats, including C#, XML, C++, JAVA, or any other programming, scripting, macro, or document-oriented language, or other commands or instructions, for a playback interface or other mechanism to drive UI-based applications for UI system actions. Recorded step tokens for native recording actions may be included in code 450 such as a script file (which may be routed directly to the token passer 435) or embedded in other code 450.

In some implementations, the playback tool 420 receives a single file that combines code and tokens from different applications and recording modes by interleaving the data. For example, recorded step tokens for native recording actions for different native recorders are combined into one stream, along with code for UI system architecture actions and any other recorded user input. Or, the tool 420 receives separate files for different applications and recording modes.

In the playback tool 420, the reader 410 receives playback code 450 and verifies the correctness of the code 450. For example, the playback tool receives a file containing playback code and attempts to verify that the file is internally consistent and consistent with the current status of the system. If any inconsistencies are found, the user is notified, and, in some implementations, the user is asked to manually complete the step. Alternatively, playback is terminated.

For playback according to the UI system architecture playback path, the reader 410 passes the code 450 to the UI system architecture player 425 for programmatic control of applications as specified by the code 450. For playback according to the native recording playback path, the reader 410 passes recorded step tokens for native recorded data to the token passer 435.

B. Native Recorder Playback Path

For native macro or UI recorder playback, the playback tool 420 passes tokens (shown as token passer 435) from the tool 420 to the application 440 that includes the appropriate native recording environment. The tool 420 passes the tokens over the special native playback interface. Before doing so, the tool 420 may interpret additional layers of data that were added to the recorded step tokens, including marking information such as application name, timestamps, index values, etc., so that the steps are played back by the correct application and in the proper sequence.

Unlike other kinds of information in the code 450, recorded step tokens for native recording data are not directly interpreted by the playback tool 420. Instead, the tokens are passed as opaque chunks of data by the token passer 435 to the application 440 (shown as the token accepter 442 component). The application 440 interprets the tokens, passing the macro recording data from the tokens to the macro player 445. In the application 440, recorded macro data is interpreted in the application's native macro recording environment. The macro data is expressed in a language such as VBA, PerfectScript, M4, TeX, or another macro language. An application's internal recording capabilities provide a robust and reliable framework for playback, sometimes allowing playback that is not possible through the UI system architecture.

The application 440 extracts the recorded steps to prepare the recorded steps for playback. The application 440 may extract one recorded step action from a single token, or the application 440 may extract multiple recorded step actions from a single token. As for the mechanics of the reverse tokenization, the application 440 may read recorded step action data from one or more fields of a data structure for a token, which was passed by copy or reference from the tool 420. Or, the application 440 may unpack recorded step action data passed as parameters of a method call. Or, the application 440 uses some other mechanism to extract recorded step actions from tokens. Conceptually, the extraction may be viewed as reading the recorded step action data from a token data structure, or unwrapping the recorded step action data from token information. This "reveals" the macro language instructions, which are recognizable in the appropriate native recording environment.

The application 440 may also process marking data that was prepended, appended, or otherwise added to the recorded step action data when tokenizing the data. The marking data provides relevant details for playback, for example, application information (e.g., the name of the application and its version), a timestamp to indicate an order, privileges information (e.g., what rights are needed to play the step), etc.

The tool 420 supports the special native playback interface in the sense that it formats information for passing to the application 440 across the interface, makes the appropriate calls across the interface, implements callback methods for the application 440 to call, etc. The application 440 supports the interface in the sense that it implements methods for the tool 420 to call, handles information passed in by the tool as expected, calls callback methods of the tool 420, etc. The exact call and processing mechanisms used for the interface are implementation dependent.

C. UI System Playback Path

The application 440 with the native macro recorder playback and/or another application 460 may support playback according to the UI system architecture with the UI system architecture player 425. The player 425 is in essence an engine to programmatically control features of a UI-based application. For this playback path, the playback tool 420 processes the code 450 with the player 425 to replicate the recorded steps and UI activity through programmatic interaction with the UI-based application.

In some implementations, the tool 420 performs UI system architecture playback with components as described in the U.S. patent application entitled "Recording/Playback Tools for UI-based Applications," filed Jun. 15, 2004. Alternatively, the tool 420 uses another technique for UI system architecture playback.

At the start of playback, a comparison may be made between the current conditions and the conditions under which the UI recording was made. If significant variations are detected, the user is informed, and offered the option to continue.

In some cases, the playback code is self-executing and requires no additional input or action to control. Alternatively, UI system actions are put into an internal playback queue, which allows the player module 425 to process each recorded step in order. The player 425 gets a recorded step from the queue, waits for the appropriate application to become available, waits for the process to be ready for input, executes the recorded step, and reports the result of the step to the playback tool 420 or elsewhere. If any of those steps fail, a simple sleep function is called and the player 425 simply waits a certain period of time before attempting to reproduce the recorded step again. Or, when a step cannot be performed, the user is notified and asked to complete the step. This allows playback failures to be handled gracefully without crashing the playback tool or any other associated applications.

Instead of relying on the player 425, some applications may also substitute their own playback tool to run generated code.

D. Tool Architecture and Uses

In general, the various modules of the tool 420 are pluggable, which means they may be replaced with other modules with similar functionality for different applications. The tool 420 is thus extensible; its functionality may be altered for different applications. The tool 420 may present a menu of options for pluggable modules, thus allowing a user to control loading of appropriate modules for the functionality desired by the user.

The playback tool provides various configurable options. The playback tool 420 may be configured to indicate how playback is to take place. For example, the playback tool may be configured to pause during playback when a "Pause" button is actuated. Or, the tool 420 pauses when user input is required to continue processing the playback code. The playback tool may be configured to perform playback as fast as the computer system running the code can "Paint." Alternatively, playback occurs as fast as possible without waiting for Paint to complete. In some implementations, multiple playback series are run simultaneously against separate applications.

To improve the security of playback, the recording tool 220 of FIG. 2 may encrypt playback code and/or the tokens embedded therein. If so, the playback tool 420 decrypts the code and/or tokens. Other security measures include requiring that users re-enter user names and passwords on playback, not logging such data, checking the security mode of the playback code against the security mode of the user (e.g., requiring administrator status for users trying to play back administrator-level scripts), and only allowing buffer playback (playback from code and/or tokens not put in a file) when it can be verified that the buffer contents were recorded by the current user, in the current session.

The tool 420 is responsible for loading other pluggable modules as needed, enforcing security (e.g., checking for privileges), spawning playback threads, synchronizing activities between modules, building and maintaining queues used for playback, logging errors (e.g., to a local file or optionally to a network server or service), and collecting information about playback.

The relationships shown between modules in FIG. 4 indicate the main flow of information; other relationships are not shown for the sake of simplicity. Depending on implementation, modules can be added, omitted, split into multiple modules, combined with other modules, and/or replaced with like modules. Alternatively, a tool with different modules and/or other configurations of modules performs one or more of the playback techniques described herein.

The user interface of the tool 420 may be a VCR-like interface positioned around a playback window, docked to the top or bottom of a computer screen, or minimized to a task bar. The interface includes buttons for features such as "Pause," "Stop," and "Play," as well as an area for presenting description of the steps being played back when such a description is available. For examples of such interfaces, see the U.S. patent application entitled "Recording/Playback Tools for UI-based Applications."

E. Playback Techniques

Figure 5:
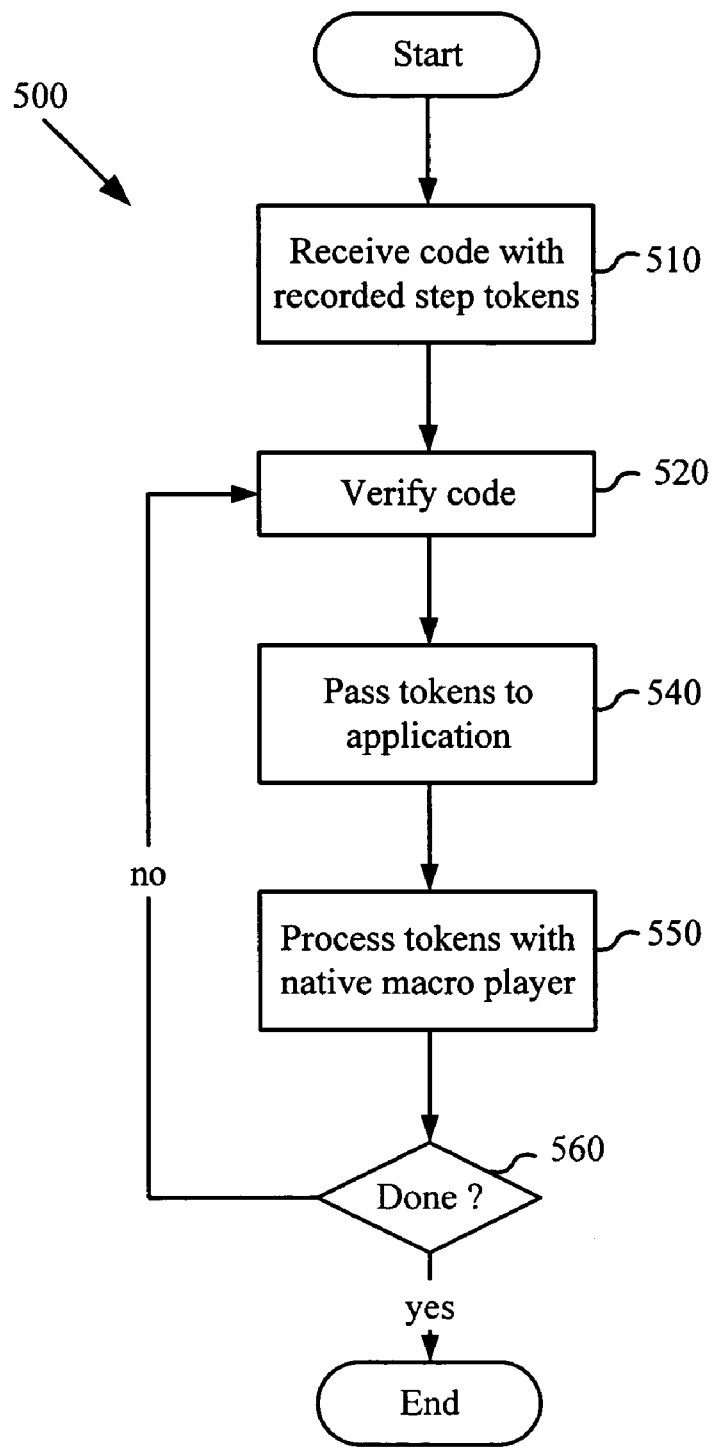
FIG. 5 is a flowchart illustrating a technique for managing playback of application-native macro activity with a system-wide UI playback tool.

FIG. 5 shows a technique 500 for managing playback of application-native macro activity with a system-wide UI playback tool. A tool and application such as the playback tool 420 and application 440 shown in FIG. 4 perform the technique 500. Alternatively, another tool and/or application perform the technique 500.

The tool receives 510 code with recorded step tokens. For example, the code is a script file including the tokens. Or, the code is programming language code having the tokens embedded therein.

The tool then verifies 520 the code. The tool may verify the correctness, ordering, and internal consistency of the tokens, or verify that the tool and application are ready for correct playback. In doing so, the tool may consider marking information added to tokens for the sake or identification or sequencing. For example, the tool uses a verification mechanism described above. If a recorded action cannot be verified, the user may be prompted to terminate playback or, alternatively, perform an action.

The tool then passes 540 the recorded step tokens to the appropriate application. The application processes 550 the tokens, extracting recorded macro data, and plays back the recorded native macro actions in the application's native recording playback environment to replicate the steps performed by a user against the application. Processing the native recorded actions typically involves replicating recorded UI activity as smoothly as possible with little or no interference by a user. Thus, a system UI recorder tool may effectively manage and interoperate with the application's internal recording environment with a high degree of reliability.

The tool or application determines 560 whether to continue playback. For example, the tool and application finish when the code or tokens are completely played back, when the user terminates playback, or when playback ends due to an error, or the tool and application wait when playback stalls to solicit data entry from the user.

Alternatively, various stages of the technique 500 are separately or in various combinations performed in conjunction with other stages. For example, while FIG. 5 shows the verification 520 and passing 540 occurring before token processing 550, alternatively one or both of these operations are performed concurrently with the processing 550 for tokens in a playback pipeline.

IV. Computing Environment

The above described tools for macro and UI recording and playback for diverse GUI-based software (e.g., the tool 200 of FIG. 2) and macro and UI recording techniques can be implemented on any of a variety of computing devices and environments, including computers of various form factors (personal, workstation, server, handheld, laptop, tablet, or other mobile), distributed computing networks, and Web services, as a few general examples. The macro and UI recording tools and techniques can be implemented in hardware circuitry, as well as in macro recording, processing and viewing software 980 executing within a computer or other computing environment, such as the one shown in FIG. 6.

Figure 6:
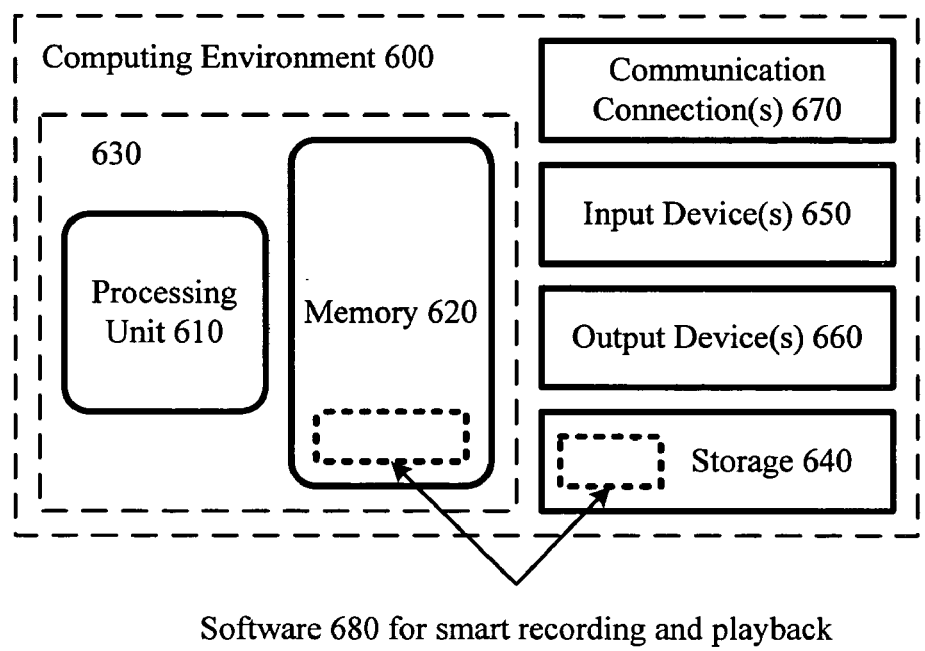
FIG. 6 is a block diagram of a suitable computing environment for implementing system-wide UI recording and/or playback.

FIG. 6 illustrates a generalized example of a suitable computing environment 600 in which the described techniques can be implemented. The computing environment 600 is not intended to suggest any limitation as to scope of use or functionality of the tools and techniques described herein, as they may be implemented in diverse general-purpose or special-purpose computing environments.

With reference to FIG. 6, the computing environment 600 includes at least one processing unit 610 and memory 620. In FIG. 6, this most basic configuration 630 is included within a dashed line. The processing unit 610 executes computer-executable instructions and may be a real or a virtual processor. In a multi-processing system, multiple processing units execute computer-executable instructions to increase processing power. The memory 620 may be volatile memory (e.g., registers, cache, RAM), non-volatile memory (e.g., ROM, EEPROM, flash memory, etc.), or some combination of the two. The memory 620 stores software 680 implementing the smart recording tools and techniques.

A computing environment may have additional features. For example, the computing environment 600 includes storage 640, one or more input devices 650, one or more output devices 660, and one or more communication connections 670. An interconnection mechanism (not shown) such as a bus, controller, or network interconnects the components of the computing environment 600. Typically, operating system software (not shown) provides an operating environment for other software executing in the computing environment 600, and coordinates activities of the components of the computing environment 600.

The storage 640 may be removable or non-removable, and includes magnetic disks, magnetic tapes or cassettes, CD-ROMs, CD-RWs, DVDs, or any other medium which can be used to store information and which can be accessed within the computing environment 600. The storage 640 stores instructions for the macro and UI recording and playback software 680.

The input device(s) 650 (e.g., for devices operating as a control point in the device connectivity architecture) may be a touch input device such as a keyboard, mouse, pen, or trackball, a voice input device, a scanning device, or another device that provides input to the computing environment 600. For audio, the input device(s) 650 may be a sound card or similar device that accepts audio input in analog or digital form, or a CD-ROM reader that provides audio samples to the computing environment. The output device(s) 660 may be a display, printer, speaker, CD-writer, or another device that provides output from the computing environment 600.

The communication connection(s) 670 enable communication over a communication medium to another computing entity. The communication medium conveys information such as computer-executable instructions, audio/video or other media information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The macro and UI recording and playback techniques herein can be described in the general context of computer-readable media. Computer-readable media are any available media that can be accessed within a computing environment. By way of example, and not limitation, with the computing environment 600, computer-readable media include memory 620, storage 640, and combinations of any of the above.

The techniques herein can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of my invention may be applied, I claim as my invention all such embodiments as may come within the scope and spirit of the following claims and equivalents thereto.

I claim:

1. A computer-readable storage medium storing computer-executable instructions for causing a computer system programmed thereby to perform a method comprising:
   receiving a plurality of internal macro actions passed as one or more opaque recorded step tokens from a graphical user interface-based application across a native recording interface to an external UI recorder configurable to interoperate with multiple different internal macro recorders for multiple different applications, including the graphical user interface-based application, the internal macro actions being recorded in a native format for the graphical user interface-based application;
   recording the one or more opaque recorded step tokens with the external UI recorder;
   associating the one or more opaque recorded step tokens with relevant data in the external UI recorder; and
   generating playback code, including:
      mapping at least one logical recording event token into corresponding instructions in the playback code; and
      combining into a single code stream the one or more opaque recorded step tokens and the corresponding instructions for the at least one logical recording event token, wherein the one or more opauue recorded step tokens are embedded in the playback code without conversion to other expressions in the playback code;
   wherein the one or more opaque recorded step tokens comprise discrete chunks of data whose contents are not interpreted by the external UI recorder but are recognizable in the graphical user interface-based application.

2. The computer-readable storage medium of claim 1 wherein the plurality of internal macro actions are generated by an internal macro recorder of the graphical user interface-based application and wherein the one or more opaque recorded step tokens are for handling by the external UI recorder to interoperate with the internal macro recorder of the graphical user interface-based application.

3. The computer-readable storage medium of claim 1 wherein the method further comprises:
   receiving a plurality of system user interface actions for user interactions against a second graphical user interface-based application;
   generating one or more system user interface tokens for the plurality of system user interface actions; and
   recording the one or more system user interface tokens with the external UI recorder.

4. The computer-readable storage medium of claim 1 wherein the method further comprises:
   receiving a plurality of raw user actions for user interactions against a second graphical user interface-based application; and
   recording the plurality of raw user actions with the external UI recorder.

5. The computer-readable storage medium of claim 1 wherein the relevant data comprises application identification information for the graphical user interface-based application.

6. The computer-readable storage medium of claim 1 wherein the one or more opaque recorded step tokens are received by the external UI recorder in batch mode from the graphical user interface-based application.

7. The computer-readable storage medium of claim 1 wherein the one or more opaque recorded step tokens are received by the external UI recorder in interactive mode from the graphical user interface-based application.

8. The computer-readable storage medium of claim 1 wherein the method further comprises:
   passing the one or more opaque recorded step tokens from the external UI recorder back to the graphical user interface-based application; and
   playing back the plurality of internal macro actions.

9. The computer-readable storage medium of claim 1 wherein the relevant data comprises timestamps and index values so that the recorded step tokens can be played back in proper sequence.

10. The computer-readable storage medium of claim 1 wherein at least some of the one or more opaque recorded step tokens comprise parameters of a method call.

11. The computer-readable storage medium of claim 1 wherein at least some of the one or more opaque recorded step tokens comprise a persistent ID associated with a UT element that allows the UT element to be uniquely identified in another instance of the graphical user interface-based application.

12. The computer-readable storage medium of claim 11 wherein at least some of the one or more opaque recorded step tokens farther comprise hierarchical identification information and control-pattern specific information.

13. The computer-readable storage medium of claim 1 wherein the method farther comprises the external UT recorder receiving notification from the graphical user interface-based application that the graphical user interface-based application is compatible with the external UT recorder.

14. The computer-readable storage medium of claim 1 wherein the method farther comprises the external UT recorder collecting input data from a graphical user interface, resolving the user input data to at least one user interface element affected by the user input data, and expressing results of the resolving as the at least one logical recording event token.

15. In a computing device that implements an application having a native macro recording environment, a method of tokenizing user interactions and passing the tokenized user interactions to a system UI recorder program, the method comprising:
   receiving input that indicates user interactions with the application having the native macro recording environment;
   with the computing device that implements the application, recording the user interactions in the application's native macro recording environment;
   with the computing device that implements the application, representing the user interactions as one or more recorder tokens for a system UI recorder program configured to interoperate with multiple different internal macro recorders for multiple different applications, including the application having the native macro recording environment, wherein the one or more recorder tokens encapsulate the user interactions such that the one or more recorder tokens are macro language independent but contents of the one or more recorder tokens are recognizable to the application's native macro recording environment, and wherein the one or more recorder tokens are passed as opaque chunks of data whose contents are not interpreted by the system UI recorder program;

with the computing device that implements the application, passing the one or more recorder tokens to the system UI recorder program for generation of playback code that includes:

mapping at least one logical recording event token into corresponding instructions in the playback code; and combining into a single code stream the one or more recorder tokens, whose contents are recognizable to the application's native macro recording environment, and the corresponding instructions for the at least one logical recording event token, wherein the one or more recorder tokens are embedded in the playback code without conversion to other expressions in the playback code;

such that the user interactions are opaque within the one or more recorder tokens to the system UI recorder program.

16. The method of claim 15 further comprising:

with the computing device that implements the application, receiving a second set of one or more actions expressed in a system UI recording language; and with the computing device that implements the application, representing the second set of one or more actions as the at least one logical recording event token.

17. The method of claim 15 wherein the one or more recorder tokens are received by the system UI recorder program in batch mode from the application.

18. The method of claim 15 wherein the one or more recorder tokens are received by the system UI recorder program in interactive mode from the application.

19. The method of claim 15 wherein the application represents at least one user interaction at a location as at least one macro language instruction that hooks into an internal object model of the application, and wherein at least one recorder token encapsulates the at least one macro language instruction to facilitate playback despite changes in interface layout of a user interface in which the macro language instruction is played back.

20. The method of claim 15 further comprising:

receiving input that indicates user interactions with a second of the plural applications having a second native macro recording environment;

with the computing device that implements the application, recording the user interactions with the second application in the second native macro recording environment;

with the computing device that implements the application, representing the user interactions with the second application as a second set of one or more recorder tokens for the system UI recorder program, wherein the second set of one or more recorder tokens encapsulate the user interactions with the second application such that the second set of one or more recorder tokens are macro language independent but contents of the second set of one or more recorder tokens are recognizable to the second application's native macro recording environment; and with the computing device that implements the application, passing the second set of one or more recorder tokens to the system UI recorder program for combination into the single code stream, such that the user interactions with the second application are opaque within the second set of one or more recorder tokens to the system UI recorder program.

21. A computer system comprising:

computer memory and a central processing unit;

a system-wide UI recording tool stored in computer memory and executable using the central processing unit for recording and playing back user interface activity, the system-wide UI recording tool comprising:

a module for collecting a first set of data associated with user interface activity against plural different applications, wherein the first set of data is expressed in any of plural native recording languages for the plural different applications;

a module for storing the collected first set of data in memory associated with the system-wide UI recording tool;

a module for retrieving at least a portion of the stored collected first set of data from memory and for converting the at least a portion of the stored collected first set of data into a set of tokens, the converting including adding marking data to the set of tokens, the marking information comprising the application name and a timestamp;

a module for verifying the set of tokens as internally consistent, the verifying comprising considering marking information added to the set of tokens; wherein the set of tokens are passed as opague chunks of data whose contents are not interpreted by the system-wide UI recording tool;

a module for generating playback code, wherein the generating includes:

mapping at least one logical recording event token into corresponding instructions in the playback code; and combining into a single code stream the set of tokens and the corresponding instructions for the at least one logical recording event token, wherein the set of tokens are embedded in the playback code without conversion to other expressions in the playback code; and a module for managing playback of the user interface activity by supplying at least some of the set of tokens to the respective plural different applications with which the first set of data is associated, the respective plural different applications determined using the respective plural application names found in the set of tokens.

22. The computer system of claim 21 wherein the modules are extensible.

23. The computer system of claim 21 wherein the system-wide UI recording tool further comprises:

a module for collecting a second set of data associated with second user interface activity, wherein the second set of data is expressed in a non-native, system UI recording language, and wherein the at least one logical recording event token represents the second set of data expressed in the non-native, system UI recording language.

24. The computer system of claim 21 wherein the first set of data comprises macro language instructions.

25. The computer system of claim 21 wherein the collecting the first set of data is in batch mode.

26. The computer system of claim 21 wherein the collecting the first set of data is in interactive mode.

27. The computer system of claim 21 wherein the system-wide UI recording tool provides a heavyweight recording mode which collects detailed information about the user interface activity, and a lightweight recording mode which collects less information about the user interface activity than the heavyweight recording mode.

28. In a computing device that implements a software program with an internal recorder and native playback interface, a method comprising:

passing a set of one or more recorder tokens from a system UI recorder program to the software program for playback by the internal recorder of the software program using the native playback interface, the one or more recorder tokens being passed as opaque chunks of data whose contents are not interpreted by the system UI recorder program, wherein the system UI recorder program is configurable to interoperate with multiple different internal recorders for multiple software programs, including the software program having the native playback interface, and wherein the set of one or more recorder tokens are embedded in playback code generated by:

mapping at least one logical recording event token into corresponding instructions in the playback code; and combining into a single code stream the set of one or more recorder tokens and the corresponding instructions for the at least one logical recording event token, wherein the set of one or more recorder tokens are embedded in the playback code without conversion to other expressions in the playback code;

with the computing device that implements the software program, extracting a set of one or more internal recorder actions from the set of one or more recorder tokens, wherein the set of one or more internal recorder actions is expressed in an internal recording language used by the software program, whereby the system UI recorder program interoperates with the internal recorder for the software program;

processing marking data associated with at least one recorder token of the set of one or more recorder tokens, the marking data comprising application information, process information, and at least one timestamp;

with the computing device that implements the software program, executing a recorded action associated with the at least one recorder token; and with the computing device that implements the software programs, reporting results of the recorded action.

29. The method of claim 28 wherein the method further comprises:

passing a second set of one or more recorder tokens from the system UI recorder program to a second software program of the multiple software programs, for playback by a second internal recorder of the second software program; and extracting a second set of one or more internal recorder actions from the second set of one or more recorder tokens, wherein the second set of one or more internal recorder actions is expressed in a second internal recording language used by the second software program, whereby the system UI recorder program interoperates with the second internal recorder for the second software program.

30. The method of claim 28 wherein the method further comprises:

playing back the corresnonding instructions to programmatically control a second software program of the multiple software programs, the at least one logical recording event token representing system UI actions expressed in a system UI recording language, whereby the system UI recorder program interoperates with the second software program.

31. The method of claim 28 wherein the method further comprises, from the system UI recorder program to the software program, passing the corresponding instructions generated from the at least one logical recording event token, which represent UI system architecture inputs, for programmatic playback.

* * * * *

UNITED STATES PATENT AND TRADEMARK OFFICE
CERTIFICATE OF CORRECTION

PATENT NO. : 7,653,896 B2  Page 1 of 1
APPLICATION NO. : 10/882861
DATED : January 26, 2010
INVENTOR(S) : Howard B. Herdeg, III It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 921 days.

Signed and Sealed this

Twenty-third Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,653,896 B2 | Page 1 of 1 |
| APPLICATION NO. | : 10/882861 | |
| DATED | : January 26, 2010 | |
| INVENTOR(S) | : Howard B. Herdeg, III | |

It is certified that error appears in the above-identified patent and that said Letters Patent is hereby corrected as shown below:

In column 21, line 38, in Claim 1, delete "opauue" and insert -- opaque --, therefor.

In column 22, line 28, in Claim 11, delete "UT" and insert -- UI --, therefor.

In column 22, line 29, in Claim 11, delete "UT" and insert -- UI --, therefor.

In column 22, line 34, in Claim 12, delete "farther" and insert -- further --, therefor.

In column 22, line 37, in Claim 13, delete "farther" and insert -- further --, therefor.

In column 22, line 37, in Claim 13, delete "UT" and insert -- UI --, therefor.

In column 22, line 40, in Claim 13, delete "UT" and insert -- UI --, therefor.

In column 22, line 42, in Claim 14, delete "farther" and insert -- further --, therefor, In column 22, line 42, in Claim 14, delete "UT" and insert -- UI --, therefor.

In column 24, line 28, in Claim 21, delete "opague" and insert -- opaque --, therefor.

In column 26, line 7, in Claim 28, delete "programs," and insert -- program, --, therefor.

In column 26, line 25, in Claim 30, delete "corresnonding" and insert -- corresponding --, therefor.

Signed and Sealed this
Twenty-fifth Day of January, 2011

David J. Kappos
*Director of the United States Patent and Trademark Office*